United States Patent [19] [11] Patent Number: 5,903,560
Samejima et al. [45] Date of Patent: May 11, 1999

[54] PARALLEL OPTICAL TRANSMISSION SYSTEM AND OPTICAL TRANSMISSION APPARATUS

[75] Inventors: Noriko Samejima; Satoshi Kakuma, both of Kanagawa, Japan

[73] Assignee: Fujitsu Limited, Kanagawa, Japan

[21] Appl. No.: 08/847,113

[22] Filed: May 1, 1997

Related U.S. Application Data

[62] Division of application No. 08/614,176, Mar. 12, 1996, Pat. No. 5,793,510.

[30] Foreign Application Priority Data

Apr. 24, 1995 [JP] Japan .................................. 7-098784

[51] Int. Cl.[6] ................................................ H04J 14/00
[52] U.S. Cl. ............................ 370/378; 370/381; 370/434
[58] Field of Search .................................... 370/374, 378, 370/381, 434, 395; 359/117, 128, 115

[56] References Cited

U.S. PATENT DOCUMENTS

| 5,361,255 | 11/1994 | Diaz et al. | 370/374 |
| 5,530,698 | 6/1996 | Kozaki et al. | 370/355 |
| 5,604,734 | 2/1997 | Buhrgard | 370/388 |
| 5,739,932 | 4/1998 | Tomooka et al. | 359/110 |
| 5,748,630 | 5/1998 | Bergantino et al. | 370/395 |
| 5,764,392 | 6/1998 | Van As et al. | 359/124 |

FOREIGN PATENT DOCUMENTS

| 5102999 | 4/1993 | Japan . |
| 529688 | 5/1993 | Japan . |
| 5183526 | 7/1993 | Japan . |
| 5227243 | 9/1993 | Japan . |
| 6120743 | 4/1994 | Japan . |

*Primary Examiner*—Min Jung
*Attorney, Agent, or Firm*—Helfgott & Karas P.C.

[57] ABSTRACT

A first optical transmission device 1 is connected to a second optical transmission device 2, and the second optical transmission device 2 is connected to a third optical transmission device 3, via a plurality of optical transmission lines. Transfer data and a clock signal synchronous with the transfer data are transferred in parallel from the first optical transmission device 1 to the second optical transmission device 2 through the plurality of optical transmission lines. Transfer data and a clock signal synchronous with the transfer data are transferred in parallel from the second optical transmission device 2 to the third optical transmission device 3 through the plurality of optical transmission lines. The second optical transmission device 2 stops outputting data to the third optical transmission device 3 when the clock signal transferred from the first optical transmission device 1 cannot be detected.

3 Claims, 12 Drawing Sheets

[nocontent]
PARALLEL OPTICAL TRANSMISSION SYSTEM AND OPTICAL TRANSMISSION APPARATUS This is a division of application Ser. No. 08/614,176, filed Mar. 12, 1996 now U.S. Pat. No. 5,793,510.

BACKGROUND OF THE INVENTION

1. Field of the Invention

The present invention relates to an optical transmission system for simultaneously transmitting transfer data and its clock signal, or transfer data and its control signal, and more specifically to a parallel optical transmission system connected via a plurality of optical cables between boards and between devices in an information processing system and information transmission switch system.

2. Description of the Related Art

Recently in an information communications network, there are increasing requests for the transfer of image data in addition to voice and data communications.

In response to these requests, various services are provided at different transmission speeds. When files are transferred in a LAN, etc., data may be transferred in data bursts. ATM systems have become popular as an effective system for practically realizing such services using a single communications system.

In an ATM system, transmission data are divided into 48-byte fixed-length payloads. A 5-byte header indicating routing information, etc. is added to each payload to form a cell. Thus, data are transferred at an optional speed by controlling the number of cells to be transmitted.

In the ATM system, cell data are processed in parallel to enhance the efficiency of a switching process. At this time, the cell data are transmitted in parallel between devices forming a switch system. Since an ATM system is normally large in scale, the devices are connected to each other via metal cables such as coaxial cables, twisted pair lines, etc. provided in parallel. The cell data are transmitted via the cables.

Recently, for services in which data such as video-on-demand data, that is, animation reproducing data, etc, are transferred, the data should be exchanged and transferred at a higher speed. Therefore, in a switch system where data are concentrated, a data transfer speed of several gigabits/second is required between the devices. With the increasing size of the switch system, the distance between the devices becomes longer. Thus, it is required to transfer data at a high speed between the devices distant to each other in the switch system.

Based on the above described background, an optical fiber has been applied to a parallel transmission line for connection between devices in a switch system. At this time, each of the devices in the switch system is connected in parallel via a plurality of optical fibers. For example, the cell data are transferred in parallel in 8-bit or 16-bit units in the switch system. A clock signal and control information about the cell data are transferred simultaneously with the cell data.

Also in a transmission system other than the ATM system, data to be transferred are transmitted in parallel through a plurality of optical fibers, and a control signal is also transferred simultaneously with the data.

The prior technologies relating to the parallel optical transmission are, for example, Tokukaihei 5-183526, Tokukaihei 5-227243, Tokukaihei 6-120743, Tokukaihei 5-29688, etc.

If a fault occurs in the above described optical transmission line, the fault is fundamentally detected on the receiving side. That is, a device on the receiving side detects the presence or absence of significant data by determining an arriving cell to be significant or insignificant (idle cells). If no cells arrive at the receiving side from the transmitting side (for example, at the switching module from the subscriber interface device), the device detects that the level of the optical signal received by the device on the receiving side indicates a value smaller than a predetermined value. Thus, the device determines a disconnection, etc. Otherwise, the physical form of the optical connector for connecting the optical transmission apparatus to the optical fiber is designed such that the connection/disconnection of the optical connector allows failure to be successfully detected.

However, the conventional systems are not provided with the capabilities of controlling the optical output when the above described failure occurs. Therefore, if no cells arrive at the receiving side from the transmitting side, the optical output from the device on the transmitting side is not stopped, but the data containing significant data are continuously output. Thus, the data output from the device on the transmitting side are lost before arriving at the device on the receiving side. Especially, with the increasing data transfer speed in transmitting data in parallel transmission lines, the amount of lost data also increases. Since the device on the transmitting side continues outputting optical signals, a light is output from a connector of the optical fiber in the device on the receiving side when the connector is removed in the device on the receiving side. This is not desired in consideration of safety if the light level is high.

When the system is restored from the state in which no signals arrive from the transmission side to the normal state, an effective method of reactivating the system is earnestly demanded, but has not been successfully developed yet.

The above listed problems are not only caused in the ATM system, but also caused in normal optical transmission systems.

SUMMARY OF THE INVENTION

The present invention aims at reducing the data lost when a failure occurs in the optical transmission line and at providing a parallel optical transmission system for successfully activating the system when the system is restored from the failure.

A first optical transmission apparatus is connected to a second optical transmission apparatus, and the second optical transmission apparatus is connected to a third optical transmission apparatus, via a plurality of optical transmission lines. Transfer data and a clock signal synchronous with the transfer data are transferred in parallel from the first optical transmission apparatus to the second optical transmission apparatus via the plurality of optical transmission lines.

With the above described configuration, the second optical transmission apparatus stops outputting data to the third optical transmission apparatus when the clock signal transferred from the first optical transmission apparatus cannot be detected. The second optical transmission apparatus resumes outputting data to the third optical transmission apparatus when it continuously detects for a predetermined time a clock signal transferred from the first optical transmission apparatus, when it has stopped outputting data to the third optical transmission apparatus.

Furthermore, the first optical transmission apparatus can be formed by a duplicated system. In the duplicated system, an apparatus in one system is set in an active state while an apparatus in the other system is set in a standby state. If the second optical transmission apparatus cannot continuously detect the clock signal transferred from the first optical transmission apparatus for a predetermined time, then the first optical transmission apparatus can be designed to communicate with the second optical transmission apparatus using the standby apparatus.

Another aspect of the present invention is to perform two-way communications between the first and second optical transmission apparatuses, and to transfer in parallel in each direction transfer data and a clock signal synchronous with the transfer data.

With the above described configuration, the first optical transmission apparatus stops optical output to the second optical transmission apparatus when it cannot detect the clock signal transferred from the second optical transmission apparatus. The first optical transmission apparatus resumes optical output to the second optical transmission apparatus when it continuously detects for a predetermined time a clock signal transferred from the second optical transmission apparatus when it has stopped optical output to the second optical transmission apparatus.

DETAILED DESCRIPTION OF THE INVENTION

Figure 1:
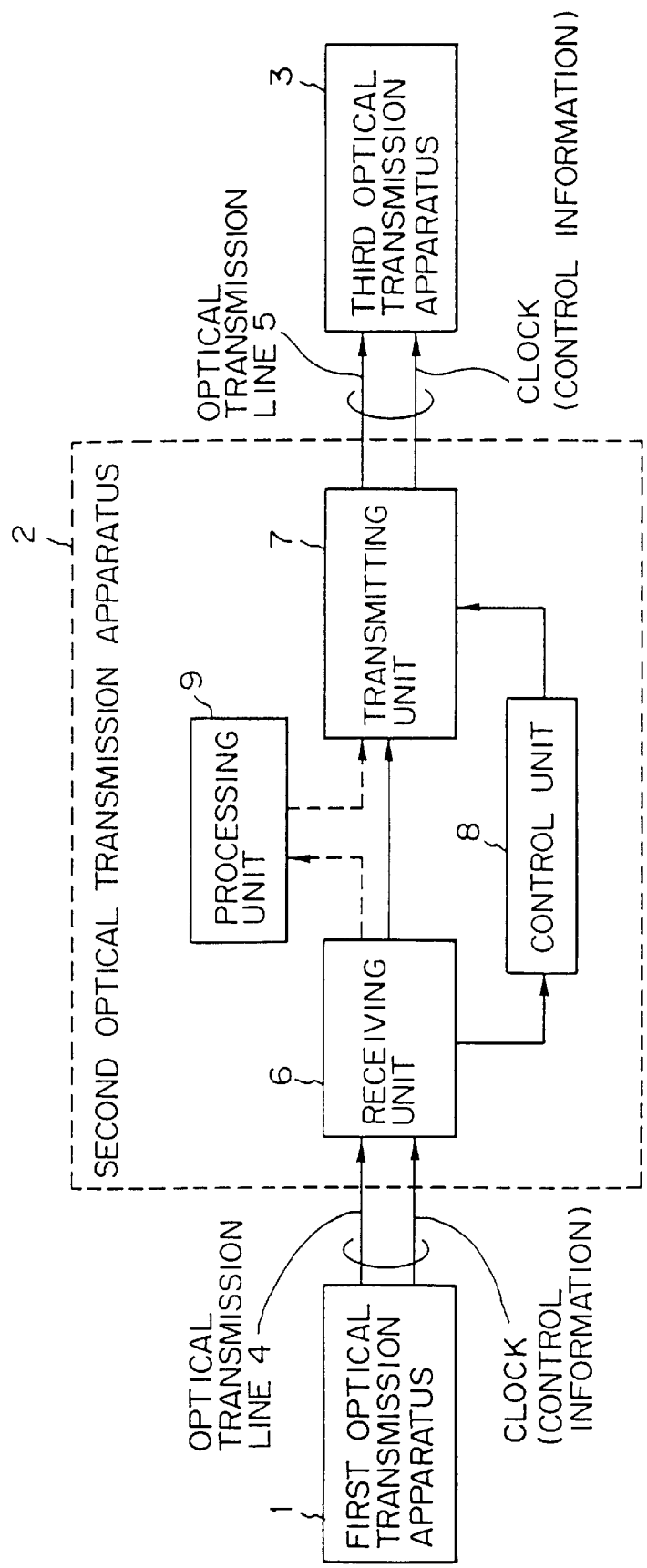
FIG. 1 shows a first aspect of the present invention.

The basic configuration of a first aspect of the present invention is described by referring to FIG. 1.

In a system according to the first aspect of the present invention, a first optical transmission apparatus 1 is connected to a second optical transmission apparatus 2, and the second optical transmission apparatus 2 is connected to a third optical transmission apparatus 3, via a plurality of optical transmission lines 4 and 5. Transfer data and clock signals synchronous with the transfer data are transferred in parallel from the first optical transmission apparatus 1 to the second optical transmission apparatus 2 through the optical transmission line 4. Transfer data and clock signals synchronous with the transfer data are transferred in parallel from the second optical transmission apparatus 2 to the third optical transmission apparatus 3 through the optical transmission line 5.

The second optical transmission apparatus 2 determines that a failure has occurred in the communications from the first optical transmission apparatus 1 to the second optical transmission apparatus 2 if no clock signals can be detected as being transferred from the first optical transmission apparatus 1. As a result, the second optical transmission apparatus 2 stops all optical output to the third optical transmission apparatus 3, thereby setting the optical transmission line 5 to a turned-off state.

The second optical transmission apparatus 2 resumes optical output to the third optical transmission apparatus 3 when it detects a clock signal as being transferred from the first optical transmission apparatus 1 when it has stopped optical output to the third optical transmission apparatus 3. That is, if a fault is removed from the communications from the first optical transmission apparatus 1 to the second optical transmission apparatus 2, the second optical transmission apparatus 2 automatically resumes optical output to the third optical transmission apparatus 3. Therefore, the system is successfully reactivated when it recovers from the failure.

The second optical transmission apparatus 2 generally comprises a receiving unit 6, transmitting unit 7, and control unit 8. The receiving unit 6 monitors the optical transmission line 4 to determine whether or not a clock signal is received, and notifies the control unit 8 of the monitor result.

The transmitting unit 7 transmits in parallel the transfer data and the clock signals synchronous with the transfer data to the third optical transmission apparatus 3. Assuming that the second optical transmission apparatus 2 is a relay device, the transmitting unit 7 outputs the transfer data received by the receiving unit 6. Assuming that the second optical transmission apparatus 2 is a switch, the transfer data received by the receiving unit 6 are output by the transmitting unit 7 after being switched by a processing unit 9.

The transfer data received by the receiving unit 6 do not have to match those output by the transmitting unit 7. That is, the processing unit 9 can be designed to output other data generated regardless of the transfer data received by the receiving unit 6.

The control unit 8 stops optical output from the transmitting unit 7 when the receiving unit 6 cannot detect a clock signal. The control unit 8 instructs the transmitting unit 7 to resume the optical output to the third optical transmission apparatus 3 if it receives a notification that the clock signal has been detected, when the optical output to the third optical transmission apparatus 3 has been stopped.

Figure 2:
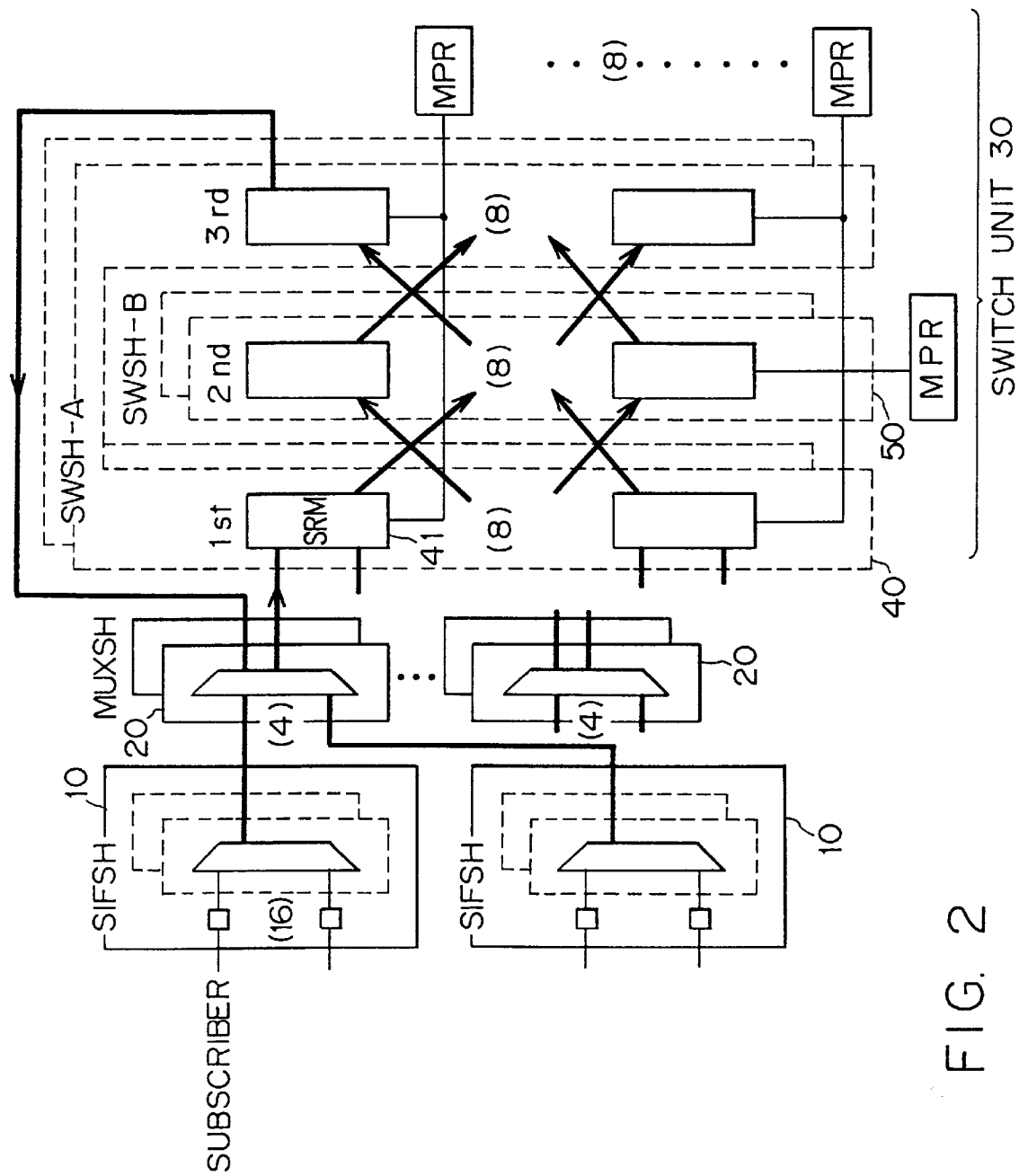
FIG. 2 shows the general configuration of the system to which the optical transmission system of the present invention is applied.

FIG. 2 shows the general configuration of the system to which the optical transmission system of the present invention is applied. In this example, an ATM switching system is explained.

A subscriber interface device (SIFSH) 10 accommodates up to 16 subscriber lines, multiplexes and concentrates the data received from the subscribers, and transfers the data to a multiplexing device (MUXSH) 20 in a parallel optical format. A parallel optical format refers to transferring cell data in a 16-bit parallel format and transferring with the cell data a clock signal, cell frame signal, cell enable signal, parity data, and control data. The clock signal, cell frame signal, cell enable signal, parity data, and control data will be explained later.

The multiplexing device 20 accommodates up to 4 optical transmission lines (highways) for connection to the subscriber interface device 10, multiplexes the data transferred from the subscriber interface device 10, and transfers the data to a switch unit 30.

The switch unit 30 is formed by 3 stages, and each stage is provided with a self-routing switch. The self-routing switches in the first and third stages are provided in a switch device (SWSH-A) 40, and the self-routing switch in the second stage is provided in a switch device (SWSH-B) 50. Up to 8 self-routing modules (SRM) can be mounted in each stage. Each of the self-routing modules is controlled by a processor (MPR). The data transferred from the multiplexing device 20 are switched by each self-routing switch in the first through third stages, and transferred back to the multiplexing device 20 in the parallel optical format.

When the multiplexing device 20 receives the data output from the switch unit 30, it transfers the data in the parallel optical format to a predetermined subscriber interface device 10 according to the routing information set in the cell data. The subscriber interface device 10 converts the data in the parallel optical format received from the multiplexing device 20 into serial data and transfers them to a specified subscriber according to the routing information set in the cell data.

The subscriber interface device 10, multiplexing device 20, switch device 40, and switch device 50 are duplicated systems in which systems are switched in a device if a failure occurs in the device. The systems are switched by an instruction from the processor (MPR).

In the above described system, the routes represented by bold lines are parallel optical transmission lines. That is, in the routes between the subscriber interface device 10 and multiplexing device 20, between the multiplexing device 20 and switch unit 30, and between the self-routing modules in the switch unit 30, the cell data in the 16-bit parallel format, clock signal, cell frame signal, data parity, and control data are transferred in the parallel optical format.

Figure 3:
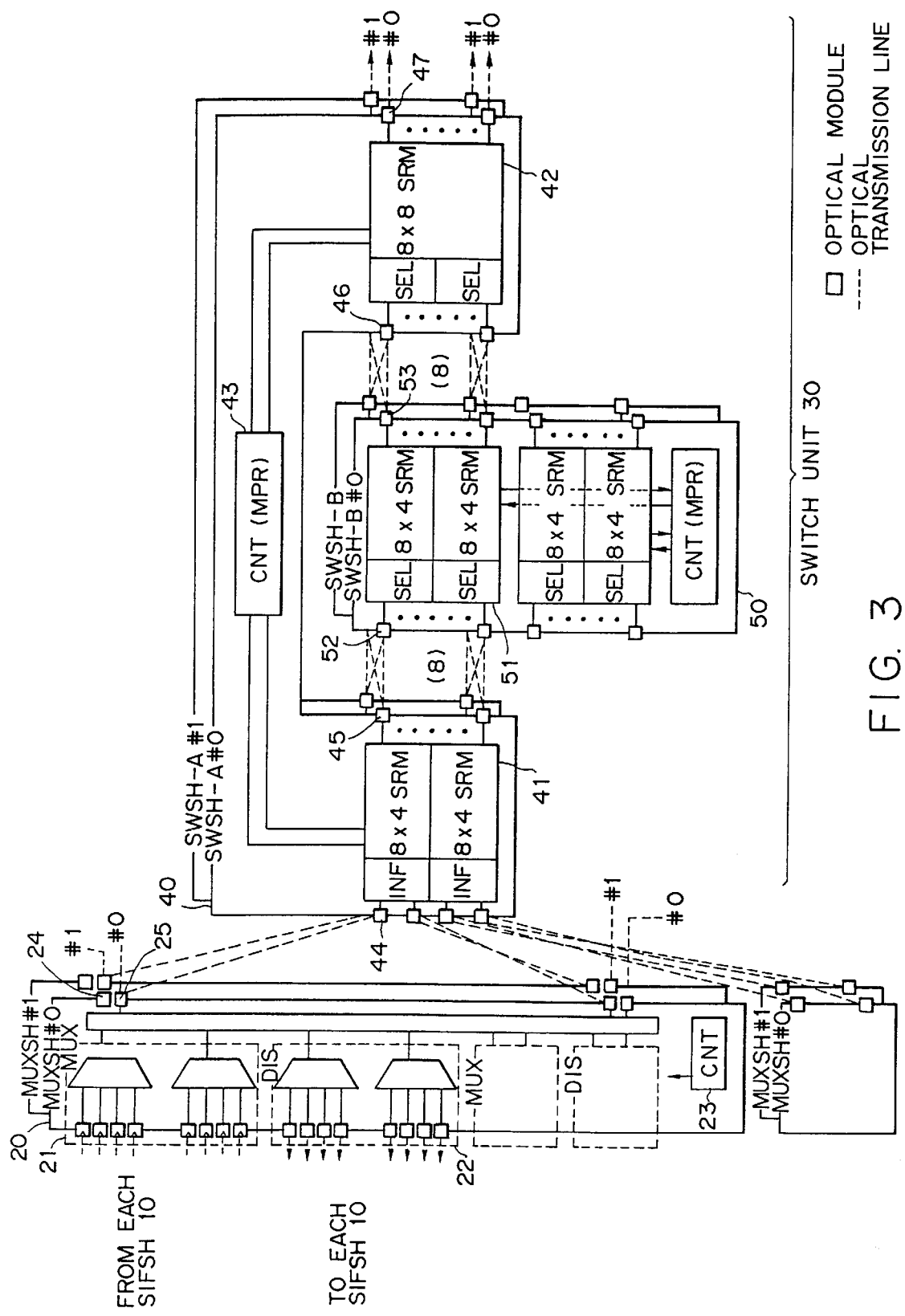
FIG. 3 shows in detail the configuration of the multiplexing device and switch device shown in FIG. 2.

FIG. 3 shows in detail the multiplexing device 20 and switch devices 40 and 50.

The multiplexing device 20 is a duplicated system and comprises #0 and #1 systems. The #0 and #1 systems have the same configuration.

The multiplexing device 20 comprises a multiplexing concentrator (MUX) 21 and distributing unit (DIS) 22. The multiplexing concentrator 21 and distributing unit 22 are controlled by a control unit (CNT) 23. The multiplexing device 20 multiplexes through the multiplexing concentrator 21 the data received from the subscriber interface device 10, and transfers the multiplexed data to the switch unit 30 using an optical module 24 in the parallel optical format. The optical module 24 comprises 21 E/O (electro-optical) elements. The output data from the optical module 24 is transferred via 21 optical fibers in the parallel optical format, and is received by an optical module 44 provided in the switch device 40. The optical module 44 comprises 21 O/E (opto-electrical) elements.

The switch device 40 comprises self-routing modules (SRM) 41 and 42 as the switch modules in the first and third stages respectively of the 3-stage self-routing switches. Each of the self-routing modules 41 and 42 has 8 input highways and 8 output highways (8×8 configuration: two 8×4 SMRs).

A control unit (CNT) 43 controls the band (the number of bands and bandwidth) of the switch device 40. Each highway is a transmission line for transferring the data in the parallel optical format and comprises 21 optical fibers.

The data transferred from the multiplexing device 20 in the parallel optical format is received by the optical module 44, converted into an electrical signal, and switched by the self-routing module 41 according to the routing information set in the cell data. The output of the self-routing module 41 is converted into an optical signal by an optical module 45 and transferred to the switch device 50 in the parallel optical format.

The switch device 50 comprises a self-routing module 51 as a switch module in the second stage of the 3-stage self-routing switch. The data output from the optical module 45 is converted into an electrical signal by an optical module 52 and switched by the self-routing module 51. The switched data is converted into an optical signal by an optical module 53 and transferred in the parallel optical format to the self-routing switch in the third stage in the switch device 40.

The data output from the optical module 53 is converted into an electrical signal by an optical module 46 and switched by the self-routing module 42, that is, the switch in the third stage. The switched data is converted into an optical signal by an optical module 47 and transferred to the multiplexing device 20 in the parallel optical format.

The data output from the optical module 47, that is, the data switched by the switch unit 30, is converted into an electrical signal by an optical module 25 and passed to the distributing unit 22. The distributing unit 22 demultiplexes and outputs the data to a specified subscriber interface device 10.

Thus, data are transferred in the parallel optical format between the multiplexing concentrator 21 in the multiplexing device 20 and the first stage of the switch, between the self-routing modules provided in each stage, and between the third stage of the switch and the distributing unit 22 in the multiplexing device 20.

Figures 4A, 4B:
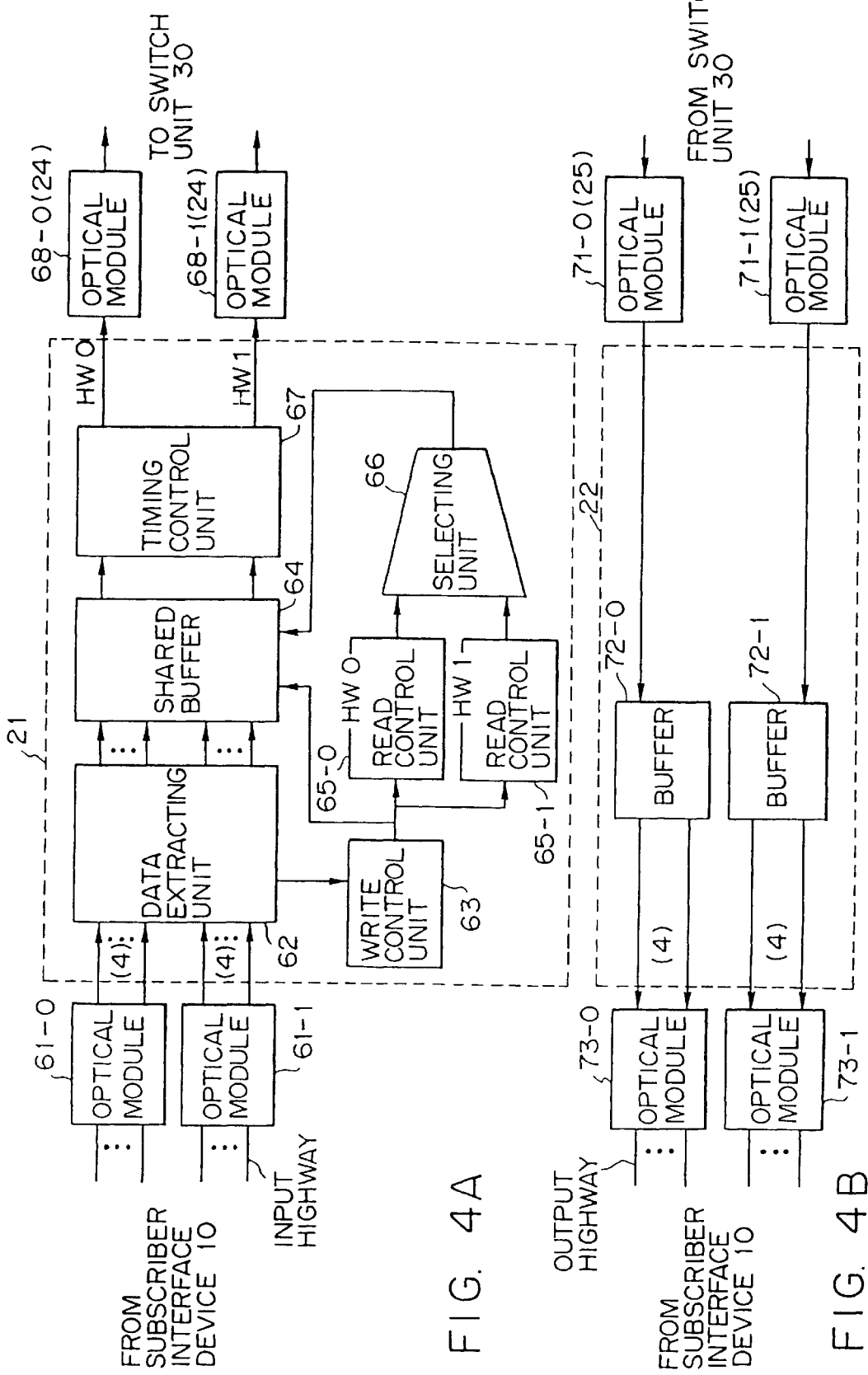
FIG. 4A shows the configuration of the multiplexing device.
FIG. 4B shows the configuration of the concentrating unit.

FIG. 4A shows the configuration of the multiplexing concentrator 21. The multiplexing concentrator 21 performs a 4:1-concentration (multiplexing) process. In FIG. 4A, the system comprises two 4:1-concentration processes.

The data transferred in the parallel optical format from the subscriber interface device 10 are converted into electrical signals by an optical module 61-0 or 61-1 provided on the receiving side of the multiplexing concentrator 21. Although the optical modules 61-0 and 61-1 are represented as signal boxes as an example in FIG. 4A, they actually comprise 21 O/E elements for each highway. That is, since each of the optical modules 61-0 and 61-1 accommodates 4 input highways, it comprises a total of 21×4 O/E elements.

The output data from the optical modules 61-0 and 61-1 are analyzed by a data extracting unit 62, and timing information and other information indicating whether or not the arriving cell is a valid cell are provided to a write control unit 63. The write control unit 63 writes the received data at a predetermined address in a shared buffer 64 according to the information received from the data extracting unit 62.

Data is read from the shared buffer 64 under the control of read control units 65-0 and 65-1. The read control units 65-0 and 65-1 output control signals to request read data to be transferred through highways HW0 and HW1, respectively. The control signals are selected by a selecting unit 66 and provided to the shared buffer 64. Each of the highways HW0 and HW1 comprises 21 parallel transmission lines, and transmits the data received by the optical modules 61-0 and 61-1.

The data read by the shared buffer 64 is reassigned a clock signal by a timing control unit 67 and passed to an optical module 68-0 or 68-1. Although the optical modules 68-0 and 68-1 are represented by single boxes as examples, each output highway (HW0 and HW1) actually comprises 21 E/O elements. The optical module 68-0 or 68-1 corresponds to, for example, the optical module 24.

The multiplexing concentrator 21 accommodates two groups (each comprises 4 highways) of input highways. The total speed of the four input highways is 5.76M cells/second (2.9 Gbps). The speed of one output highway (HW0 or HW1) is also 5.76M cells/second. On each highway, cell data are transferred in a 16-bit parallel format. Together with the cell data, a clock signal, cell frame signal, cell enable signal, data parity, and control data are transferred.

FIG. 4B shows the configuration of the distributing unit 22. The distributing unit 22 has the function of reassigning a clock and performs the 1:4-distribution (demultiplexing) process. In FIG. 4B, the system comprises two 1:4 distribution processes.

The data transferred from the switch unit 30 in the parallel optical format is converted into an electrical signal by an optical module 71-0 or 71-1 provided at the receiving side of the distributing unit 22. The data is temporarily stored in a buffer 72-0 or 72-1, output to any of the four output lines depending on the data destination, converted into an optical signal by an optical module 73-0 or 73-1, and transferred to the specified subscriber interface device 10 in the parallel optical format.

The optical module 71-0 or 71-1 comprises 21 O/E elements for each highway, and corresponds to, for example, the optical module 25 shown in FIG. 3. The optical module 73-0 or 73-1 outputs data in the parallel optical format to each of the four highways. Each highway has 21 E/O elements.

The distributing unit 22 contains 2 highway groups (each group contains 4 highways). The total speed of the 4 output highways is 5.76 M cells/second (about 2.9 Gbps). The speed of each highway accommodated by the optical module 71-0 or 71-1 is also 5.76 M cells/second. On each highway, the cell data are transferred in the 16-bit parallel format. Together with the cell data, a clock signal, cell frame signal, cell enable signal, data parity, and control data are transferred.

As described above, the multiplexing concentrator 21 and distributing unit 22 in the multiplexing device 20 are connected to the subscriber interface device 10 and switch unit 30 through a physical interface using optical transmission.

Figure 5:
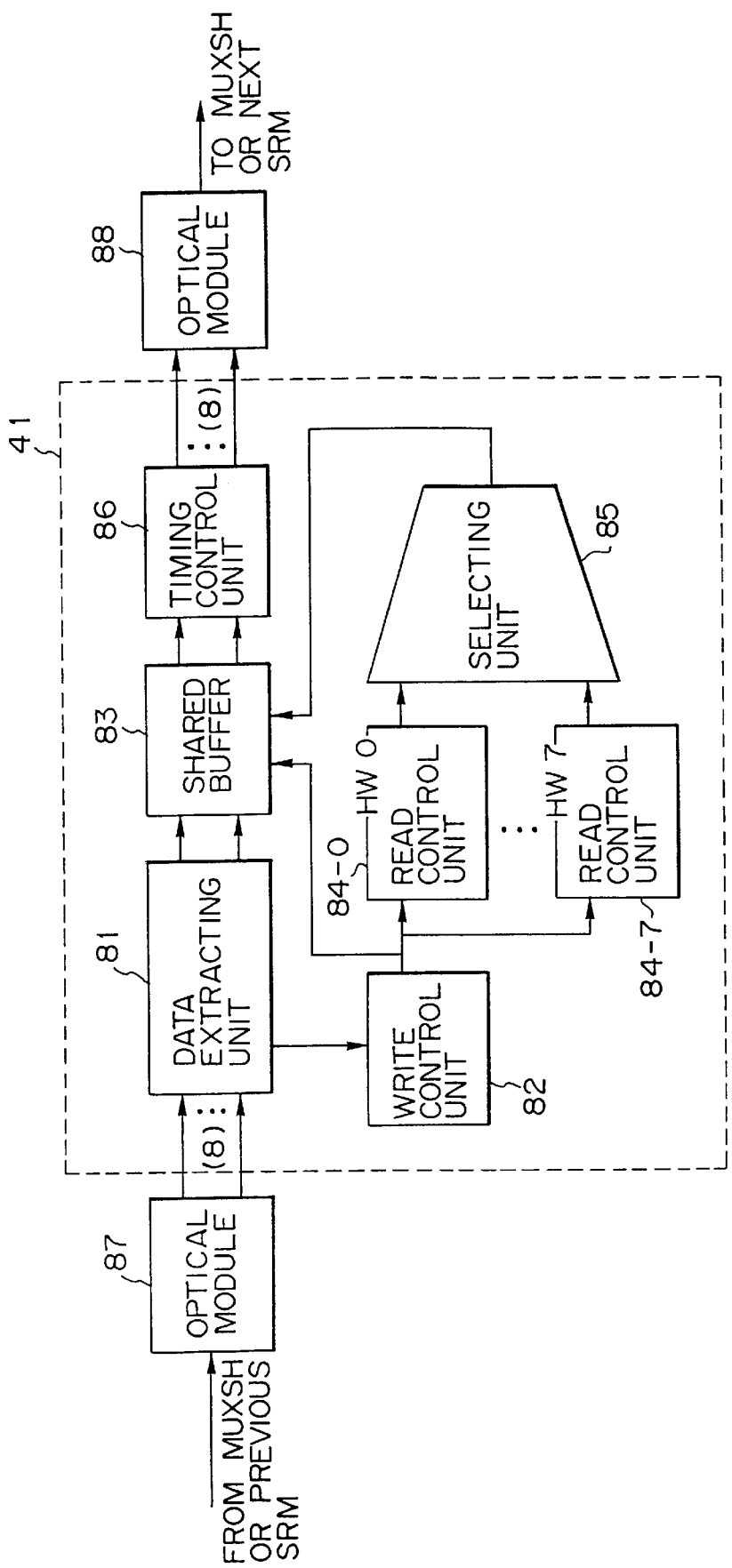
FIG. 5 shows the configuration of the self-rooting module.

FIG. 5 shows the configuration of each self-routing module. FIG. 5 actually shows the self-routing module 41 provided in the first stage of the switch device 40. The configuration of the self-routing module 41 is common to each self-routing module in the system.

The self-routing module according to the present embodiment accommodates 8 input/output highways and performs a switch process using in a shared-buffer method. The transmission speed of each highway is 5.76 M cells/second (about 2.9 Gbps).

The configuration of the self-routing module 41 is the same as that of the multiplexing concentrator 21. Since the self-routing module 41 accommodates 8 highways (HW0 through HW7), 8 read control units 84-0 through 84-7 are provided correspondingly. The data transferred in the parallel optical format from the multiplexing concentrator 21 is converted into an electrical signal by an optical module 87 provided on the receiving side, converted again into an optical signal by an optical module 88 provided on the transmitting side, and transferred to the self-routing module in the next stage in the parallel optical format. The self-routing module in the second or third stage receives data from the self-routing module in the previous stage in the parallel optical format. The output of the self-routing module in the third stage is transferred to the distributing unit 22 in the multiplexing device 20.

The optical modules 87 and 88 are designed to transmit and receive data in the parallel optical format for each highway. That is, the optical module 87 is provided with 21 O/E elements for each highway while the optical module 88 is provided with 21 E/O elements for each highway.

Figure 6:
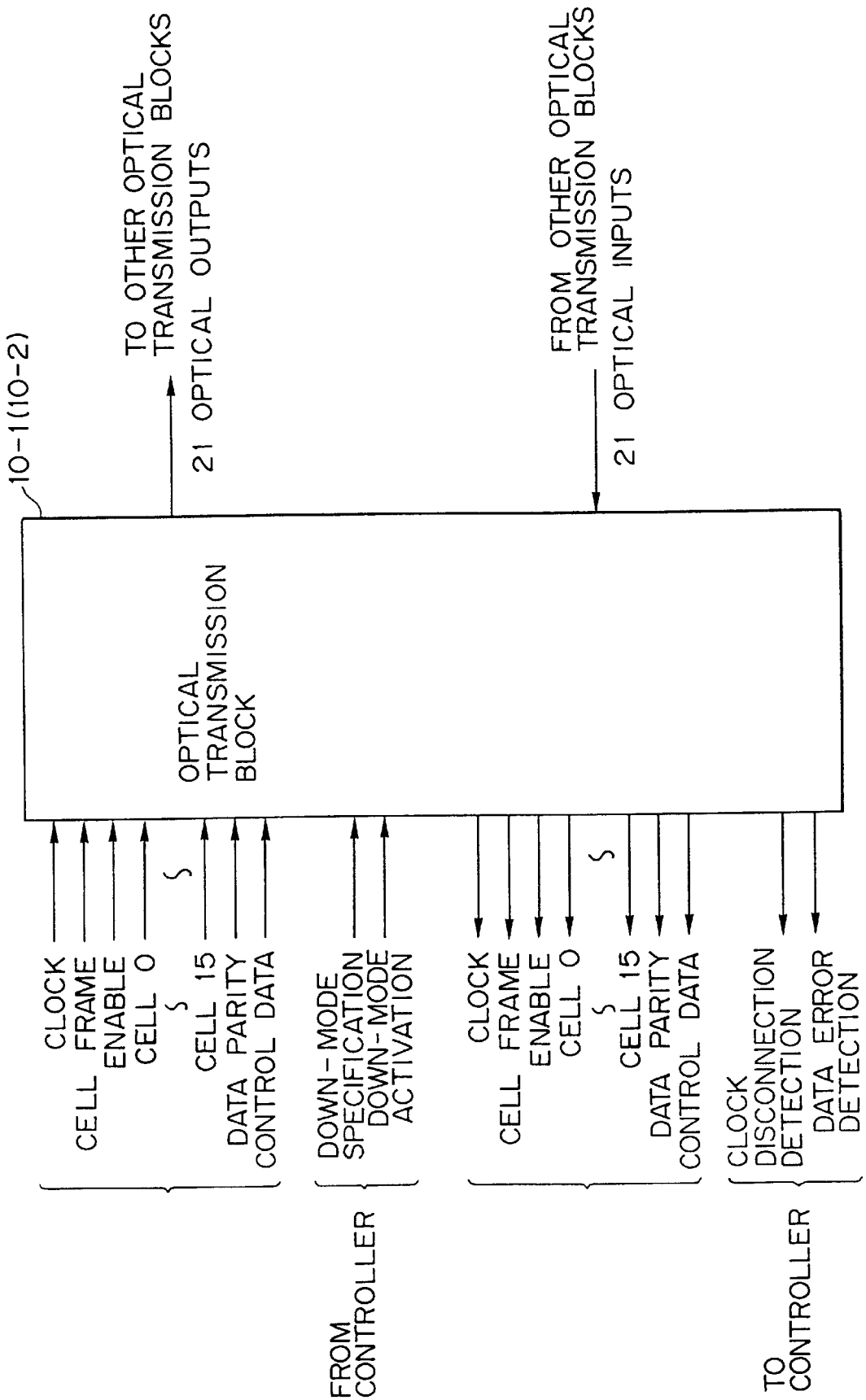
FIG. 6 shows the interface of the electric signals of the optical transmission block.

FIG. 6 shows the interface of the electrical signals of an optical transmission block. The optical transmission block shown in FIG. 6 corresponds to optical modules 61 and 68 shown in FIG. 4A. The optical transmission block also corresponds to optical modules 71 and 73 in FIG. 4B, and to optical modules 87 and 88 in FIG. 5. FIG. 6 shows a highway in each direction.

The optical transmission block has the functions of opto-electrical and electro-optical conversion functions. The optical transmission line in the system according to the present embodiment is formed by the above described 21 parallel optical fibers. Therefore, the optical transmission block performs a conversion process between the 21 optical signals and 21 electrical signals. These 21 signals are described below.

Cell data 0 through 15 are actually transmitted cell data (transfer data) and contain headers, payloads, and tag information. The cell data 0 through 15 are transferred via 16 lines at a speed of 2 bytes/clock pluse.

A clock signal is, for example, a 155.52 Mhz signal for establishing synchronization in a data transmission. That is, data to be transferred in parallel are transferred in synchronization with the clock signal including the cell data 0 through 15. As a result, data cannot be actually transferred when no clock signal is transferred.

A cell frame signal is a pulse indicating the head of a cell. An enable signal indicates whether the transfer cell is valid or invalid (idle state). A data parity signal indicates the parity of the cell data 0 through 15 and is used to detect a transmission error. The control data is used in controlling the data transmission.

The clock signal, cell frame signal, enable signal, data parity, and control data are respectively transmitted via a single line. These signals and cell data 0 through 15 are interfaced at the LV-T level (3.3 volts).

In the optical transmission block, the 21 electrical signals are converted into optical signals through respective E/O elements and output to the 21 optical fibers provided in parallel. Of the 21 optical signals, a clock signal, cell frame signal, enable signal, data parity signal, and control data are transmitted via a single respective fiber, and the cell data 0 through 15 are transmitted via 16 optical fibers.

The optical transmission block also converts the data transferred from another optical transmission block via 21 parallel optical fibers into electrical signals using respective O/E elements. These optical signals are a clock signal, cell frame signal, enable signal, data parity signal, control data and cell data 0 through 15.

In the present embodiment, the clock signal, cell frame signal, enable signal, data parity signal, control data and cell data 0 through 15 are transmitted in parallel, and are referred to as parallel data. When these signals are transmitted as optical signals, the transmission is referred to as a parallel optical format.

The optical transmission block transmits to and receives from the controller (not shown in the drawings) the following four pieces of information according to the data transferred from another optical transmission block in the parallel optical format.

A down-mode specification signal is set to indicate whether or not an optical input/output control, to be described later, should be performed (valid/invalid) when an abnormal condition occurs in the optical data transmission. The optical transmission block does not perform a control process according to a down-mode activation signal when the down-mode specification signal is set to "invalid". A clock disconnection detection signal is used to provide a notification to the controller that the clock signal of the optical signal transmitted from another optical transmission block cannot be detected for longer than a predetermined time. A data error detection signal is used to provide a notification to the controller that an error has occurred in the data of the optical signal transmitted from another optical transmission block. These signals are interfaced at the TTL level (5 volts).

Figure 7:
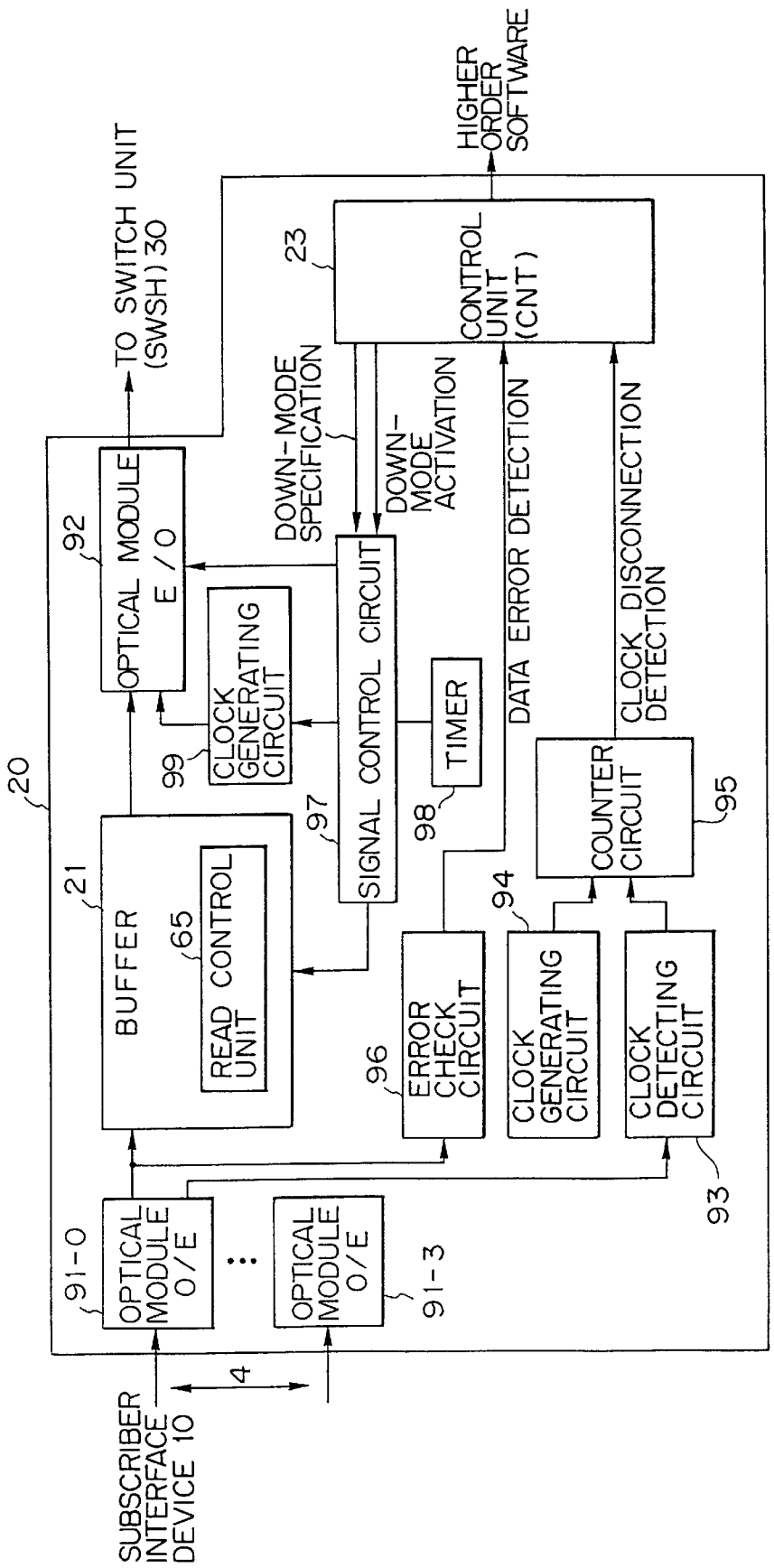
FIG. 7 shows the configuration when the parallel optical transmission system according to the first aspect of the present invention is applied to the ATM system.

FIG. 7 shows the configuration in which the parallel optical transmission method according to the first aspect of the present invention is applied to the ATM system. FIG. 7 shows an example in which the concept of the present invention is applied to the multiplexing concentrator 21 in the multiplexing device 20 shown in FIG. 2 or 3, and shows the related portions.

The multiplexing device 20 shown in FIG. 7 multiplexes the data transferred in the parallel optical format via the highways for connection to the four subscriber interface devices 10, and outputs the multiplexed data to the switch unit 30. Optical modules 91-0 through 91-3 are provided for each highway, and each of the modules comprises 21 O/E elements to receive data in the parallel optical format. Described below is how the data received by the optical module 91-0 is processed. Similar circuits are provided for the other three optical modules 91-1 through 91-3 for similar processes.

The data transferred from the subscriber interface device 10 in the parallel optical format are converted into electrical signals by the optical modules 91-0 through 91-3 (corresponding to the optical module 61-0 shown in FIG. 4A) and passed to the multiplexing concentrator 21. The multiplexing concentrator 21 is designed as shown in FIG. 4A, and the data are written to the shared buffer 64 under the control of the write control unit 63.

A clock detecting circuit 93 detects a clock signal which is one of the parallel data transferred in the parallel optical format. Clock generating circuits 94 and 99 generate clock signals having the same frequency as the above described clock signal. A counter circuit 95 counts the clock pulses detected by the clock detecting circuit 93 and checks the state of the clock signals (whether or not they are normally transferred) transmitted as one of the parallel data. When the clock detecting circuit 93 detects no clock signal is being transmitted (disconnection of clock signal), this is informed to the control unit 23. An error check circuit 96 checks using a data parity whether or not the cell data transferred in the parallel optical format have been normally transmitted. If an error has occurred, this is informed to the control unit 23.

A signal control circuit 97 is, for example, a microprocessor, and controls the operations of each circuit in the multiplexing concentrator 21 according to the down-mode activation signal transferred from the control unit 23. A timer 98 is a time keeping unit.

The operations of the above described device will be described by referring to the time chart shown in FIG. 8.

When the data transferred from the subscriber interface device 10 in the parallel optical format are received, each piece of the data is converted into an electrical signal by the optical module 91-0. The clock signal (reception clock) transferred as an optical signal is converted into an electrical signal and provided to the clock detecting circuit 93.

The clock detecting circuit 93 detects a clock signal by monitoring a rising or falling edge, and notifies the counter circuit 95 of the detection of one-cycle of the clock signal each time the clock signal is detected.

The counter circuit 95 counts two counter values. The first counter value indicates the number of the reception clock pulses detected by the clock detecting circuit 93 (one cycle of the clock signal is counted as one clock pluse). The second counter value indicates the number of clock pulses generated by the clock generating circuit 94. The second counter value is reset each time the clock detecting circuit 93 detects the reception clock. Therefore, when parallel optical data are normally received from the subscriber interface device 10, the second counter value is only necessarily in a reset state. The first counter value is reset when the clock detecting circuit 93 cannot detect the reception clock.

If the clock detecting circuit 93 cannot detect the reception clock when an abnormal condition occurs (time T1 shown in FIG. 8) in transmitting optical data from the subscriber interface device 10 to the multiplexing device 20, then the counter circuit 95 resets the first counter value to count the reception clock pluses. At this time, since the second counter value cannot be reset, the clock pluses generated by the clock generating circuit 94 are counted. When the second counter value indicates 256, the counter circuit 95 notifies the control unit 23 that an abnormal condition has occurred in the optical data transmission from the subscriber interface device 10 to the multiplexing device 20.

In response to the notification, the control unit 23 notifies a higher-order software of the occurrence of the abnormal condition. The higher-order software is executed by, for example, a processor (MPR) shown in FIG. 2. The higher-order software records in a log the occurrence of an abnormal condition in the optical data transmission from the subscriber interface device 10 to the multiplexing device 20. The control unit 23 instructs the signal control circuit 97 to take action against the abnormal condition by setting the down-mode activation signal to "H".

When the signal control circuit 97 receives this instruction through the down-mode activation signal, it checks the settings in the down-mode specification signal. When the settings indicate "invalid", then action is not taken. In this example, the settings in the down-mode specification signal indicate "valid".

The signal control circuit 97 first sets the entire optical output (including the clock signal and data 0 through data 15) of an optical module 92 to the turned-off state, thereby disconnecting the optical link between the multiplexing device 20 and the switch unit 30 (the link between the optical module 24 and optical module 44 in FIG. 3). The turned-off state of the entire optical output is maintained for 500 ms. When 500 ms have passed, the signal control circuit 97 provides 1024 clock pluses of the clock signal generated by the clock generating circuit 99 to the optical module 92.

As described above, the optical module 92 comprises 21 E/O elements. The clock signals generated by the clock generating circuit 99 are provided to the E/O elements, among the 21 E/O elements, used for in transmitting clock signals.

Therefore, the E/O elements for use in transmitting clock signals from of the optical module 92, output 1024 clock pulses clock pulses after the 500 ms turned-off state. The other E/O elements continue in the turned-off state. The E/O elements for use in transmitting clock signals operate in the cycle based on the 500 ms turned-off state and 1024 clock pulses output state set as one cycle, until the clock detecting circuit 93 detects a reception clock.

If an abnormal condition occurs in the optical data transmission from the subscriber interface device 10 to the multiplexing device 20, then the multiplexing device 20 stops the optical output of parallel data (the clock operates cyclically as described above). Since light is not emitted on the receiving side (switch unit 30) from the multiplexing device 20 when the light transmission line is checked upon detection of the abnormal condition, maintenance staff do not incur any danger of damaging their eyes. At this time, cell data are not read from the shared buffer 64 in the multiplexing unit 21, and are only read from the shared buffer 64 after the above described abnormal condition has been corrected, and are then transferred to the switch unit 30.

If an abnormal condition has occurred, then optical output to the switch unit 30 is stopped. However, since the clock signals are transferred to the switch unit 30 at predetermined intervals, it is recognized that the transmission line between the multiplexing device 20 and switch unit 30 works normally.

If the optical data transmission from the subscriber interface device 10 to the multiplexing device 20 is restored to a normal state (T2 shown in FIG. 8), then the clock detecting circuit 93 detects the reception clock, and the counter circuit 95 starts counting the first counter value to count the reception clock pulses. The second counter value is reset when the reception clock is detected by the clock detecting circuit 93.

When the first counter value counts up to 256, that is, when the reception clock pulses have been continuously counted up to 256, then the counter circuit 95 sets the clock disconnection detection signal to "L" and notifies the control unit 23 that the optical data transmission from the subscriber interface device 10 to the multiplexing device 20 has been restored to its normal state. The first counter value is reset if no reception clocks are detected. Therefore, when 256 reception clock pulses have been are continuously detected, the control unit 23 is informed of the normal state.

The control unit 23 detects the notification and informs a higher-order software that the optical data transmission from the subscriber interface device 10 to the multiplexing device 20 has been restored to its normal state, and sets the down-mode activation signal to "L" to instruct the termination of the process being performed when the abnormal condition occurs.

When the signal control circuit 97 is instructed to terminate the process according to the down-mode activation signal, it stops the process in which the optical output of the optical module 92 is set to the turned-off state. The optical module 92 then converts the data read from the multiplexing concentrator 21 into an optical signal, outputs it in the parallel optical format, and transfers it to the switch unit 30.

As described above, if the optical data transmission from the subscriber interface device 10 to the multiplexing device 20 has been restored to its normal state, then the multiplexing device 20 automatically resumes outputting data in the parallel optical format. At this time, it is recognized that the data transmission has been restored to its normal state when 256 reception clock pulses are continuously detected.

Therefore, the optical data output is not resumed by mistakenly recognizing noise on the transmission line as clock signals. Accordingly, the data transmission can be resumed only if the data transmission has been restored to its normal state.

Figure 9:
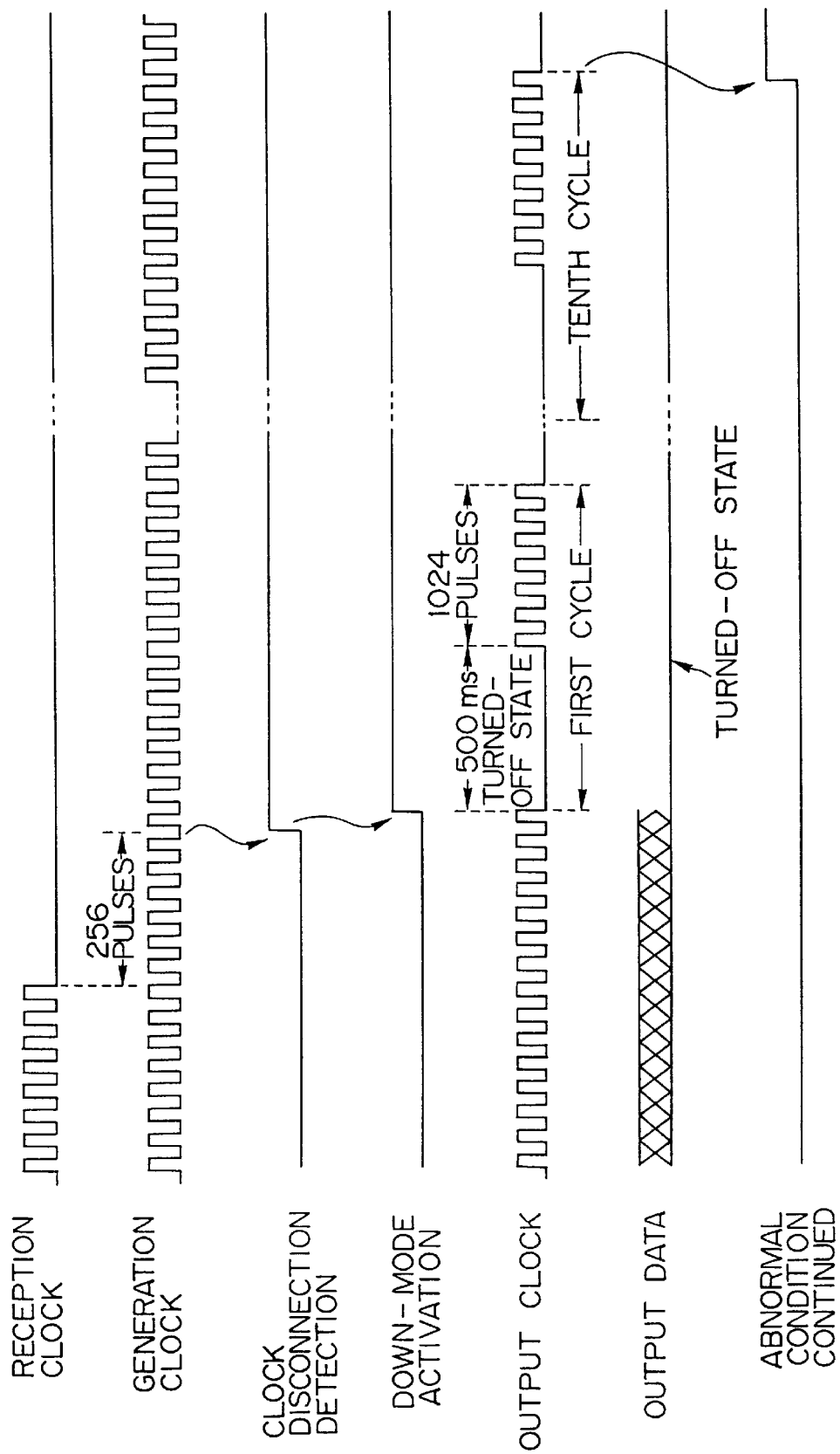
FIG. 9 is a time chart (2) showing the operations of the optical transmission apparatus.

FIG. 9 shows the process performed when an abnormal condition continues for more than a predetermined time in the optical data transmission from the subscriber interface device 10 to the multiplexing device 20.

Figure 8:
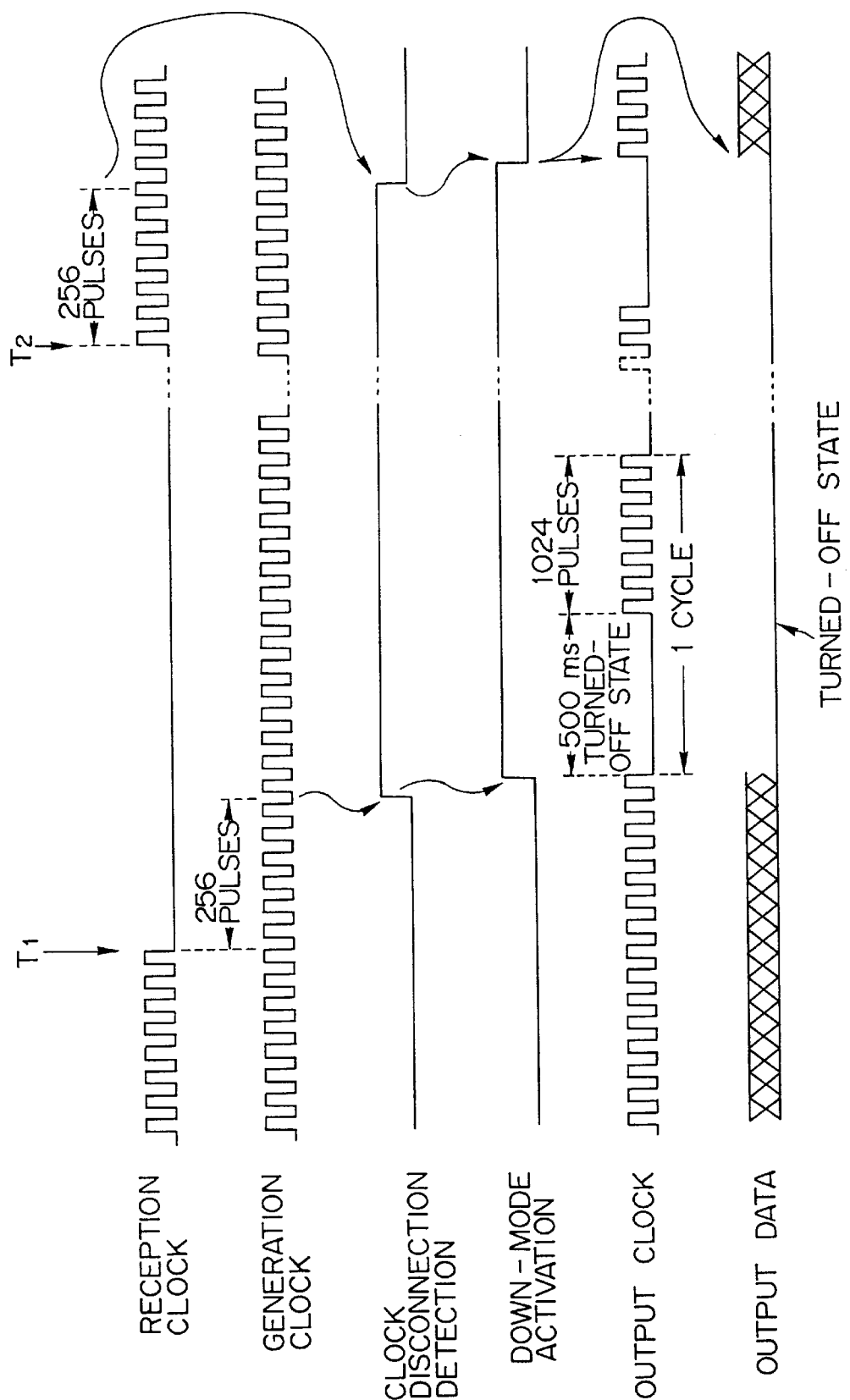
FIG. 8 is a time chart (1) showing the operations of the optical transmission apparatus.

As in the operations described by referring to FIG. 8, the clock signal output from the optical module 92 in the multiplexing device 20 alternately repeats the 500 ms turned-off state and 1024 clock pulses output state. At this time, the number of occurrences of the execution of the above described repeating cycle are counted by the counter circuit 95. If the value reaches 10, this is informed to the control unit 23 using an abnormal continuation signal (not shown in FIG. 7).

When the control unit 23 receives the notification, it informs a higher-order software that the abnormal condition still continues. The higher-order software records in a log that the abnormal condition still continues in the optical transmission from the subscriber interface device 10 to the multiplexing device 20. The information about the above described fault can be displayed on a display unit, etc.

The higher-order software then switches the system which is in an abnormal state. That is, since the above described abnormal condition is assumed to have been caused by the subscriber interface device 10, multiplexing device 20, or the transmission line between them, the abnormal condition should be removed by switching of the subscriber interface device 10 or multiplexing device 20. For example, if the above described abnormal condition has occurred when the system #0 is in an active state and the system #1 is in the standby state, in the system shown in FIG. 3, then the system #1 is switched to an active state.

The error check circuit 96 performs a parity check on the cell data when the data is transmitted from the subscriber interface device 10 to the multiplexing device 20. If errors are detected for more than one bit in this check, the occurrence of data errors and the timing of the errors are informed to the control unit 23 by setting the data error detection signal to "H" at the time when the cell after the error-detected cell is received. In response to the information, the control unit 23 requests the higher-order software to perform a predetermined process.

Thus, since the data error of the cell transmitted through the parallel optical transmission line is monitored and a link disconnection (clock signal disconnection) and data errors are independently detected, it becomes easier to perform a retrieving process even when a failure exists.

In the above described system, all optical output from the optical module 92 is stopped when no clock signal is detected from the data received in the parallel optical format by the optical module 91-0. The optical module 92 multiplexes and outputs the data received by the optical modules 91-0 through 91-3. Accordingly, the output of the data received by the optical modules 91-1 through 91-3 is also stopped. Therefore, according to another embodiment, the data output is stopped only for the optical module 91-0 when no clock signal is detected from the data received by the optical module 91-0 in the parallel optical format. In this case, the signal control circuit 97 instructs a read control unit 65 to stop reading the data received by the optical module 91-0 and written to the shared buffer 64.

According to the above described embodiment, the present invention is applied to the multiplexing device 20. It can be applied to each transmission line represented by the solid lines shown in FIG. 2.

For example, if a fault has occurred in the data transmission from the multiplexing device 20 to the switch unit 30, then the output of the optical module 45 is stopped when no clock signal is detected from the data received by the optical module 44 (shown in FIG. 3) in the parallel optical format. The self-routing module 41 accommodates 8 output highways and stops optical output from all the highways. Otherwise, an output highway from which the cell data received by the optical module 44 is output is recognized as faulty so that only the optical output to that highway can be stopped.

When a fault occurs in the data transmission from the switch unit 30 to the multiplexing device 20, two control methods are prepared. One is to stop the optical output to the subscriber interface device 10, and the other is to stop the optical output to the switch unit 30. That is, when no clock signal is detected from the data received by the optical module 25 in the parallel optical format, the optical output to the subscriber interface device 10 or switch unit 30 is stopped.

Figure 10:
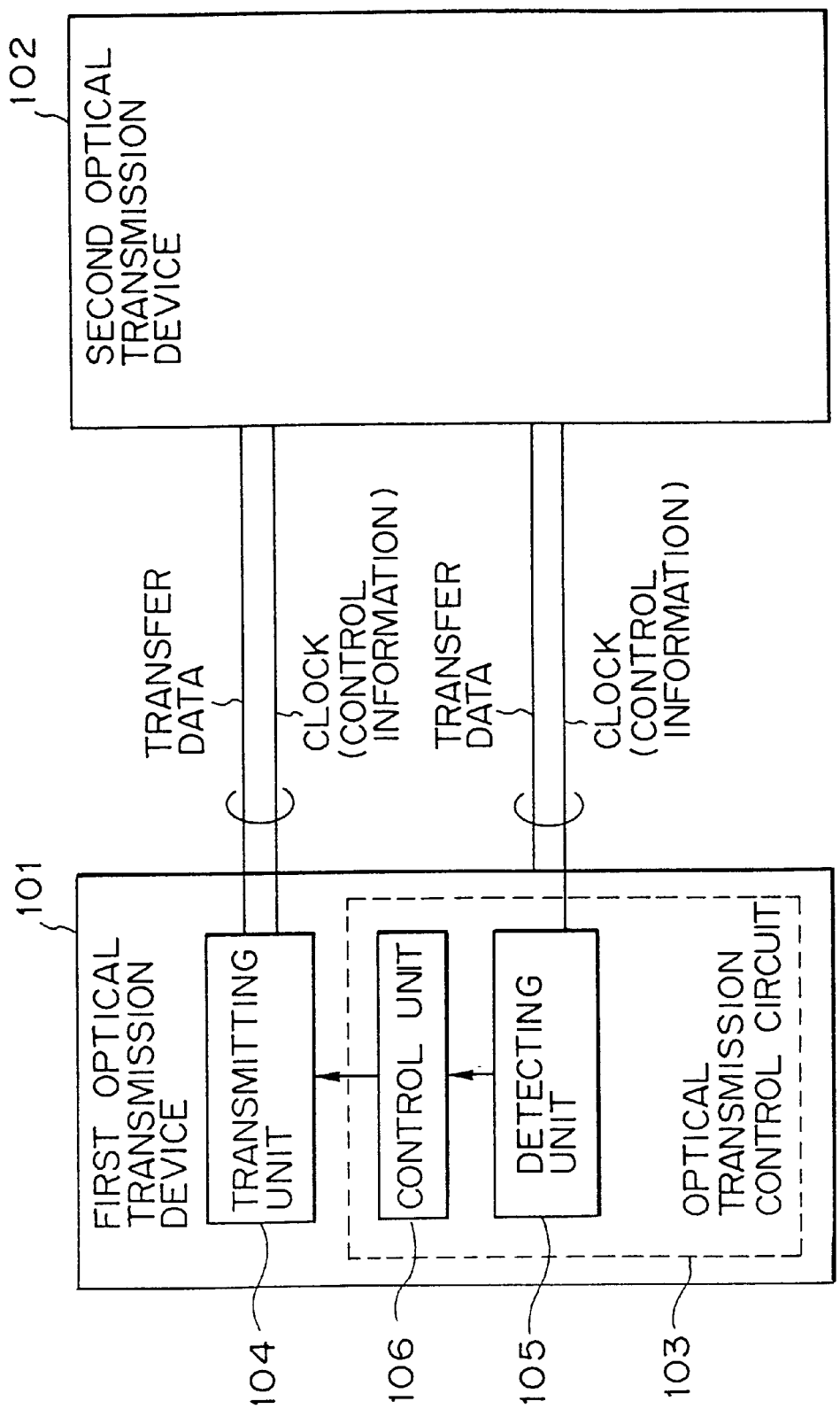
FIG. 10 shows the principle of a second aspect of a present invention.

The basic configuration according to the second aspect of the present invention is described by referring to FIG. 10.

The system according to the second aspect is based on the system in which transfer data and the clock signal synchronous with the transfer data (or a control signal for the transfer data) are optically transmitted in parallel and bi-directionally between a first optical transmission device 101 and a second optical transmission device 102.

When the first optical transmission device 101 cannot detect a clock signal (or a control signal such as a cell frame signal, etc.) transferred from the second optical transmission device 102 for a predetermined time, the transmission (optical output) from the first optical transmission device 101 to the second optical transmission device 102 is stopped. If the first optical transmission device 101 continuously receives for a predetermined time the clock signals transferred from the second optical transmission device 102 while the optical output to the second optical transmission device 102 is stopped, then the optical output from the first optical transmission device 101 to the second optical transmission device 102 is resumed.

The first optical transmission device 101 has the same configuration as the second optical transmission device 102 except that it comprises an optical transmission control circuit 103 and a transmitting unit 104.

The transmitting unit 104 transmits, to the second optical transmission device 102, transfer data and the clock signal synchronous with the transfer data. The optical transmission control circuit 103 comprises a detecting unit 105 for detecting a clock signal transferred from the second optical transmission device 102, and a control unit 106 for stopping an output from the transmitting unit 104 when the detecting unit 105 can detect no clock signal transferred from the second optical transmission device 102.

The control unit 106 alternately performs the process of stopping the optical output from the control unit 106 and the process of transmitting a predetermined number of clock pulses to the second optical transmission device 102 while the detecting unit 105 cannot detect the clock signal transferred from the second optical transmission device 102. The control unit 106 instructs the transmitting unit 104 to perform the optical transmission to the second optical transmission device 102 when the detecting unit 105 continuously detects a predetermined number of clock pulses transferred from the second optical transmission device 102.

Based on the parallel optical transmission system according to the second aspect of the present invention, a failure of a transmission line or a transmission function is detected when no clock signal is received. Therefore, if an abnormal condition has occurred in the communications through the transmission line, a faulty portion can be easily detected.

The system according to the second aspect of the present invention is based on the bi-directional communications, but is fundamentally the same as the first aspect of the present invention.

Figure 11:
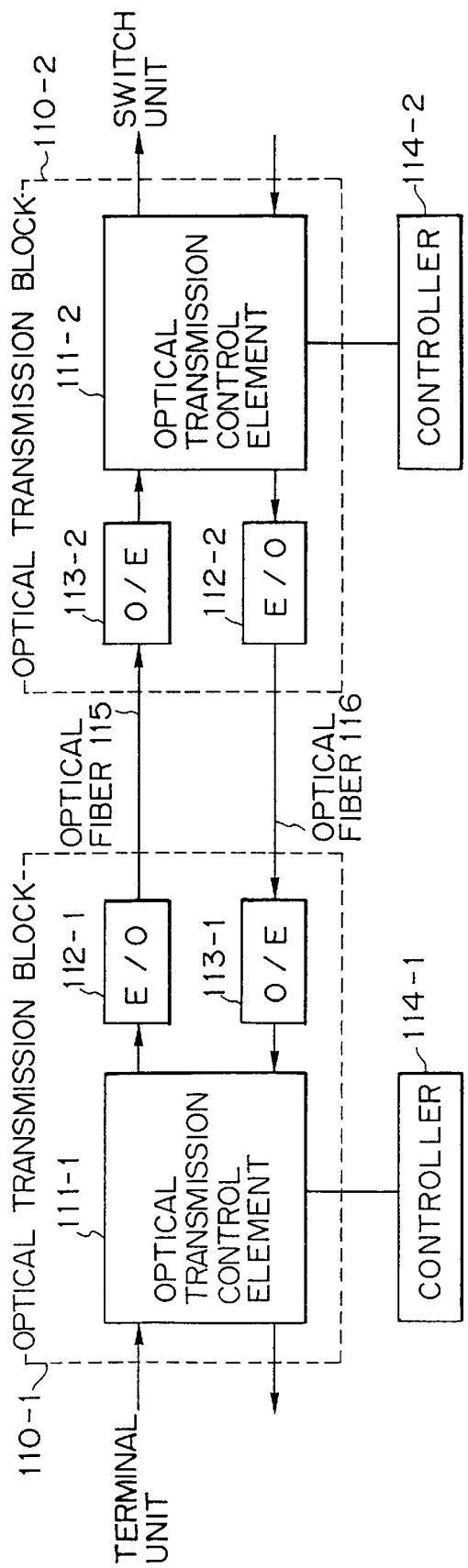
FIG. 11 shows the configuration of the system according to the second aspect of the present invention.

FIG. 11 shows the configuration of the transmission system according to the second aspect of the present invention. In this example, the transmission system according to the second aspect is applied to the ATM switch system shown in FIG. 2.

An optical transmission block 110-1 is provided at the terminal side, and comprises an optical transmission control element 111-1; E/O (electro-optical conversion element) 112-1; and O/E (opto-electrical conversion element) 113-1. An optical transmission block 110-2 has the same configuration as the optical transmission block 110-1 and comprises an optical transmission control element 111-2, an E/O 112-2, and an O/E 113-2. The optical transmission block 110-2 is provided on the switch side. Controllers 114-1 and 114-2 are provided for the optical transmission blocks 110-1 and 110-2 respectively. The optical transmission block 110-1 is connected to the optical transmission block 110-2 via a plurality of (for example, 21) optical fibers 115 and 116 in each direction.

The optical transmission block 110-1 or 110-2 is provided at the input/output unit of the multiplexing concentrator 21, distributing unit 22, and each self-routing module.

If data are transmitted between the multiplexing device 20 and switch device 40, and if the E/O 112-1 and O/E 113-1 are respectively the optical modules 24 and 25, then the E/O 112-2 and O/E 113-2 are the optical module 47 and optical module 44 respectively. If data are transmitted between the switch device 40 and switch device 50, and if the E/O 112-1 and O/E 113-1 are the optical modules 45 and 46 respectively, then the E/O 112-2 and O/E 113-2 are the optical module 53 and optical module 52 respectively. The system can also be applied to the data transmission between the subscriber interface device 10 and multiplexing device 20.

In transferring data from a terminal device to a switch unit, the optical transmission control element 111-1 receives a clock and various control signals together with the data in a cell format from the terminal device, performs input/output control in the linkage operations ( to be described later) with the controller 114-1, and passes the received data to the E/O 112-1. The E/O 112-1 converts the received data into optical signals, and transfers the signals to the optical transmission block 110-2 via the optical fiber 115.

If the optical transmission block 110-2 receives the above described data, then the O/E 113-2 converts the received data into electrical signals and passes them to the optical transmission control element 111-2. The optical transmission control element 111-2 inputs the received data, that is, the data in the cell format, a clock signal, and each control signal, to the switch unit. The input/output control of the optical transmission control element 111-2 is performed through the linkage operations with the controller 114-2.

Data are transferred from the switch unit to the terminal device basically as the above described procedure. That is, the data switched by the switch unit are transmitted to the terminal device side through the optical transmission control element 111-2, E/O 112-2, O/E 113-1, and optical transmission control element 111-1.

Figure 12:
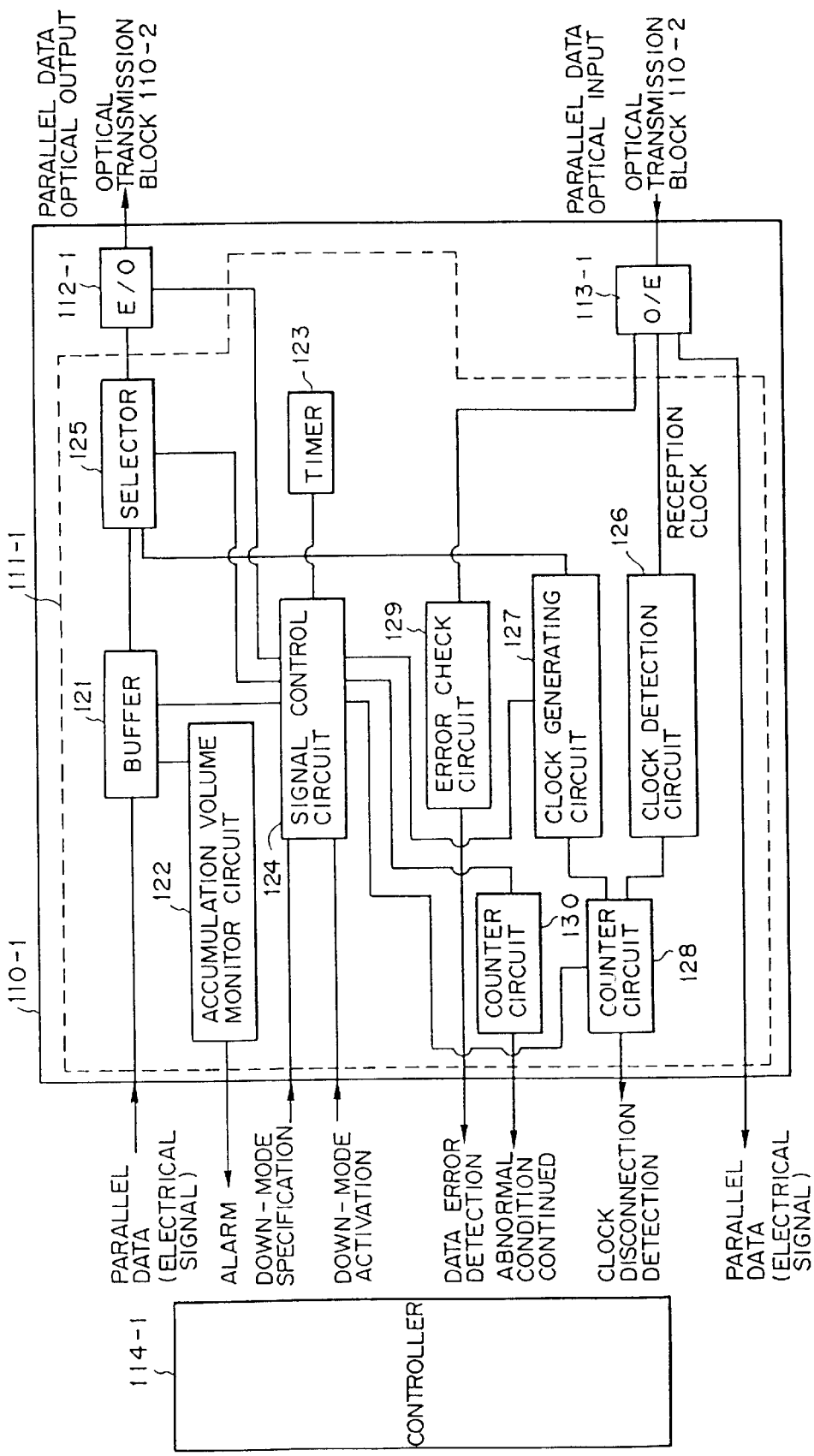
FIG. 12 is a block diagram showing the function of the optical transmission block according to the second aspect of the present invention.

FIG. 12 is a block diagram showing the function of the optical transmission block 110-1. In FIG. 12, a timer 123, a signal control circuit 124, a clock detection circuit 126, a clock generating circuit 127, a counter circuit 128, and a error check circuit 129 are assigned basically the same functions as the corresponding circuits shown in FIG. 7. The control unit (CNT) 23 shown in FIG. 7 corresponds to the controller 114-1 shown in FIG. 12.

A buffer 121 temporarily stores the parallel data received from the terminal device side. An accumulation volume monitor circuit 122 monitors the amount of accumulated data in the buffer 121, and gives an alarm to the controller 114-1 when the amount exceeds a threshold.

The signal control circuit 124 controls the operations of each circuit in the optical transmission block 110-1 according to the down-mode activation signal transferred from the controller 114-1. A selector 125 selects and outputs either the data read from the buffer 121 under the control of the signal control circuit 124, or the clock signal output by a clock generating circuit 127. A counter circuit 130 notifies the controller 114-1 of the selection result when a repetitive operation (to be described later) is repeated for a predetermined number of times (10 for example).

Next, the operations of the optical transmission block are described by referring to the time chart shown in FIG. 8. The operations of the optical transmission block 110-1 are basically the same as those according to the first aspect.

When the optical transmission block 110-1 receives the parallel optical data from the optical transmission block 110-2, each piece of data is converted into an electrical signal by the O/E 113-1, and passed to the terminal device side as electrical signals of parallel data.

The clock signal (reception clock) transferred as an optical signal from the optical transmission block 110-2 is detected by the clock detection circuit 126 and provided to the counter circuit 128 at each clock pulse. The operations of the counter circuit 128 are the same as those of the counter circuit 95 shown in FIG. 7.

If an abnormal condition occurs in the optical data transmission from the optical transmission block 110-2 to the optical transmission block 110-1 and no reception clock signal is detected by the clock detection circuit 126, then the counter circuit 128 counts the clock pulses generated by the clock generating circuit 127. When the counter circuit 128 counts 256, it sets the clock disconnection detection signal to "H" which notifies the controller 114-1 that an abnormal condition has occurred in the optical data transmission to the optical transmission block 110-1.

In response to the notification, the controller 114-1 notifies the higher-order software of the occurrence of the abnormal condition, The higher-order software recognizes that the abnormal condition has occurred in the optical data transmission from the optical transmission block 110-2 to the optical transmission block 110-1, and stops outputting cells to the optical transmission block 110-1 to prevent the cells from being discarded by the transmission fault between the optical transmission block 110-2 and the optical transmission block 110-1. The controller 114-1 sets the down-mode activation signal to "H" and instructs the signal control circuit 124 to perform the processing of the abnormal condition.

When the signal control circuit 124 receives the instruction through the down-mode activation signal, it checks the settings in the down-mode specification signal. In this example, the settings in the down-mode specification signal are assumed to be "valid".

The signal control circuit 124 first sets all optical output (including clock signal, data 0 through 15) from the optical transmission block 110-1 to the turned-off state and disconnects the optical link to the optical transmission block 110-2. That is, the signal control circuit 124 instructs the 21 E/O elements forming the E/O 112-1 to stop the optical output. The turned-off state of all optical output is maintained for 500 ms. Then, the signal control circuit 124 instructs a selector 125 to select and output a clock signal generated by the clock generating circuit 127. At this time, it specifies 1024 clock pulses to be output.

Of the 21 E/O elements forming the E/O 112-1, the E/O elements for use in transmitting clock signals output 1024 clock pulses after the 500 ms turned-off state, while other E/O elements remain the turned-off state. The E/O elements for use in transmitting the clock signals of the E/O 112-1 repeat the cycle of the 500 ms turned-off stage and the output of 1024 clock pulses until the clock detection circuit 126 detects a reception clock signal.

As described above, if an abnormal condition has occurred in the optical data transmission from the optical transmission block 110-2 to the optical transmission block 110-1, then the optical transmission block 110-1 stops the optical output of the parallel data, (the clock signal cyclically operates as described above). At this time, the cell data to be transferred are accumulated without being read from a buffer 121. Therefore, the cell data are not discarded. When the abnormal condition is successfully removed, the data are transferred to the optical transmission block 110-2.

When the optical data transmission from the optical transmission block 110-2 to the optical transmission block 110-1 is restored to its normal state, the clock detection circuit 126 detects a reception clock signal. If the counter circuit 128 counts 256 reception clock pulses, it is assumed that the optical data transmission from the optical transmission block 110-2 to the optical transmission block 110-1 has been restored to its normal state, which is informed to the controller 114-1.

In response to the information, the controller 114-1 notifies the higher-order software that the optical data transmission from the optical transmission block 110-2 to the optical transmission block 110-1 has been restored to its normal state, and sets the down-mode activation signal to "L" to terminate the processing of the abnormal condition.

When the signal control circuit 124 receives a terminate instruction through the down-mode activation signal, it issues an instruction to start reading data from the buffer 121 and stops the process of setting the output of the E/O 112-1 to the turned-off state. The E/O 112-1 converts the parallel data received as an electrical signal from the terminal device side into an optical signal for output. That is, the optical transmission block 110-1 converts the parallel data received as an electrical signal from the terminal device side into an optical signal for output.

Thus, when the optical data transmission from the optical transmission block 110-2 to the optical transmission block 110-1 has been restored to its normal state, the optical transmission block 110-1 automatically resumes the optical output of the parallel data.

Described below are the operations of the optical transmission block 110-2 under the above described conditions. The optical transmission block 110-2 has the same configuration as the optical transmission block 110-1.

When a fault has occurred in the optical data transmission from the optical transmission block 110-2 to the optical transmission block 110-1, the optical transmission block 110-2 cannot directly recognize the abnormal condition, but can be informed of the fault through the notification from the optical transmission block 110-1. That is, when an abnormal condition has occurred, the optical transmission block 110-1 repeats the cycle of the 500 ms turned-off state and the output of 1024 clock pulses. Since the optical transmission block 110-2 cannot receive even a clock signal when the output state of the optical transmission block 110-1 is in the turned-off state, its optical output is stopped. When the optical transmission block 110-2 receives 1024 clock pulses from the optical transmission block 110-1, it assumes that the optical data transmission from the optical transmission block 110-1 to the optical transmission block 110-2 is in a normal state, and outputs the data in the parallel optical format (for a time corresponding to 1024 clock pulses) to the E/O 112-1. While the optical transmission block 110-1 is repeating the above described cycle, the optical transmission block 110-2 repeats the turned-off state and the output of parallel data. The optical transmission block 110-2 outputs parallel data for a short time. Actually, the time is very short compared with 500 ms, and therefore it can be considered that the optical transmission block 110-2 practically stops optical output.

As described above, when an abnormal condition has occurred in the optical data transmission from the optical transmission block 110-2 to the optical transmission block 110-1, the optical transmission block 110-2 also stops the optical output. That is, the optical output from the device provided at the transmitting side in the faulty system is stopped.

Assume that the optical transmission block 110-1 and optical transmission block 110-2 respectively correspond to the multiplexing device 20 and switch unit 30 shown in FIG. 3, and that an abnormal condition has occurred in the data transmission from the optical module 47 to the optical module 25. In this case, since the optical module 25 cannot detect a clock signal from the data transferred in the parallel optical format, it enters a cycle of repeating the 500 ms turned-off state and the output of 1024 clock pulses from the optical module 24. Since the optical module 44 alternately receives the 500 ms turned-off state and 1024 clock pulses, the control unit (CNT) 43 recognizes the above described abnormal condition. Accordingly the optical output from the optical module 47 is actually stopped.

If the optical data transmission from the optical transmission block 110-2 to the optical transmission block 110-1 has been restored to its normal state while the above described cycle is being repeated, then the output from the E/O 112-2 in the optical transmission block 110-2 reaches the optical transmission block 110-1. That is, the optical transmission block 110-1 receives the state in which the turned-off state and parallel data are alternately repeated. Since the parallel data contain a clock signal, the optical transmission block 110-1 recognizes by the detection of the clock signal (reception clock) that the optical data transmission from the optical transmission block 110-2 to the optical transmission block 110-1 has been restored to its normal state, and outputs the parallel data from the E/O 112-1 to the optical transmission block 110-2. When the optical transmission block 110-2 receives the parallel data from the optical transmission block 110-1, it converts the parallel data received from the switch side into an optical signal and outputs it to the optical transmission block 110-1.

If the abnormal condition between the optical transmission block 110-1 and the optical transmission block 110-2 has been removed, then the data transmission can be automatically resumed therebetween.

Described below by referring to FIG. 9 is the process to be performed when an abnormal condition in the optical data transmission from the optical transmission block 110-2 to the optical transmission block 110-1 continues for a time longer than a predetermined time.

In the abnormal condition, as in the operations described by referring to FIG. 8, the output of the clock signal from the E/O 112-1 in the optical transmission block 110-1 alternately repeats the 500 ms turned-of state and the output of 1024 clock pulses. At this time, a counter circuit 130 counts each time the above described cycle is repeated. When the counter value of the counter circuit 130 indicates 10, the controller 114-1 is informed of this according to an abnormal continuation signal.

Upon receipt of the notification, the controller 114-1 notifies the higher-order software of the continuation of the abnormal condition. As in the operation according to the first aspect of the present embodiment, the higher-order software switches the system of the faulty device.

The error check circuit 129 in the optical transmission block 110-1 performs a parity check on the cell data transferred in the parallel optical format from the optical transmission block 110-2. If an error is detected in the check, then the controller 114-1 is informed of the occurrence of the data error and the timing using the data error detection signal. In response to the notification, the controller 114-1 requests the higher-order software to perform a predetermined process, if necessary.

Since the data error of the cell transmitted through the parallel optical transmission line is monitored and the link disconnection (clock signal disconnection) and the data error are independently detected, an abnormal condition can be easily detected when it occurs.

If an abnormal condition has occurred in the optical data transmission from the optical transmission block 110-2 to the optical transmission block 110-1, the optical transmission block 110-1 stops its optical output. Therefore, parallel data including the cell data are accumulated in the buffer 121. An accumulation volume monitor circuit 122 monitors the data accumulated in the buffer 121 to prevent the buffer 121 from overflowing its capacity. If the accumulation volume exceeds a predetermined threshold, the higher-order software is informed of this it through the controller 114-1 according to an alarm signal. The higher-order software then instructs the terminal device to stop outputting cells to the optical transmission block 110-1.

According to the two above described embodiments, the ATM system controls the optical output by detecting that a clock signal transmitted in parallel with the cell data is not received. It can also be designed to control the output by detecting that other data transmitted in parallel with the cell data cannot be received. For example, the optical output of the optical transmission block can be stopped each time a cell frame signal is not received.

According to the two above listed embodiments, the optical transmission line between the switch in the ATM switching unit and a terminal device is described. However, the present invention can also be applied to any system in which cell data and a clock signal (or control information about the cell data) synchronous with the cell data are optically transmitted in parallel.

Furthermore, the present invention is not only applied to the ATM system, but also to any system in which transfer data and a clock signal (or control information about the transfer data) synchronous with the transfer data are optically transmitted in parallel.

According to the present invention, an optical transmission device automatically stops its optical output when an abnormal condition occurs in the parallel optical data transmission. Therefore, the volume of discarded transfer data can be reduced, and any danger caused by continuously emitting light can be successfully avoided. If the above described abnormal condition can be removed, then the data transmission between the optical transmission devices is automatically resumed. Furthermore, an abnormal condition can be easily detected and the system can be efficiently maintained by monitoring the clock signal disconnection, data errors, etc.

What is claimed is:

1. An ATM system comprising:

a plurality of input optical lines, each of said input optical lines for transmitting each bit of an ATM cell in parallel;

an opto-electrical convertor to respectively convert optical signals input via each of said plurality of input optical lines into electrical signals;

a buffer memory;

a write control unit to write the converted electrical signals in parallel in said buffer memory;

a read control unit to read the stored electrical signals in parallel from said buffer memory; and an electro-optical convertor to respectively convert the electrical signals read from said buffer memory into optical signals and to output the converted optical signals in parallel.

2. An ATM system comprising:

a plurality of input optical line groups, each of said groups comprising a plurality of input optical lines, each of said input optical lines for transmitting each bit of an ATM cell in parallel;

a plurality of opto-electrical convertors, each provided for the corresponding input optical line group, to respectively convert optical signals input via each of said plurality of input optical lines into electrical signals;

a buffer memory;

a write control unit to write the converted electrical signals in parallel in said buffer memory;

a read control unit to read the stored electrical signals in parallel from said buffer memory; and an electro-optical convertor to respectively convert the electrical signals read from said buffer memory into optical signals and to output the converted optical signals in parallel.

3. An ATM system comprising:

a plurality of input optical lines, each of which for transmitting each bit of an ATM cell in parallel;

an opto-electrical convertor to respectively convert optical signals input via each of said plurality of input optical lines into electrical signals;

a buffer memory;

a write control unit to write the converted electrical signals in parallel in said buffer memory;

a plurality of output optical line groups, each of said groups comprising a plurality of output optical lines, each of said output optical lines for transmitting each bit of an ATM cell in parallel;

a plurality of electro-optical convertors, each provided for the corresponding output optical line group, to respectively convert the electrical signals read from buffer memory into optical signals and to output the converted optical signals to the corresponding output line group; and a read control unit to read the stored electrical signals in parallel from said buffer memory and to distribute the read electrical signals to one of said plurality of electro-optical convertors.

* * * * *